United States Patent
Hamaguchi et al.

(10) Patent No.: US 9,221,711 B2
(45) Date of Patent: Dec. 29, 2015

(54) PROCESS FOR PRODUCING OPTICAL FIBER AND PROCESSING APPARATUS FOR OPTICAL FIBER WORK USED FOR THE SAME

(71) Applicant: FUJIKURA LTD., Tokyo (JP)

(72) Inventors: Hiroki Hamaguchi, Sakura (JP); Shunichirou Hirafune, Sakura (JP); Itaru Ishida, Sakura (JP)

(73) Assignee: FUJIKURA LTD., Tokyo (JP)

( * ) Notice: Subject to any disclaimer, the term of this patent is extended or adjusted under 35 U.S.C. 154(b) by 135 days.

(21) Appl. No.: 13/911,507

(22) Filed: Jun. 6, 2013

(65) Prior Publication Data
US 2013/0333421 A1    Dec. 19, 2013

(30) Foreign Application Priority Data

Jun. 8, 2012 (JP) .................................. 2012-131384
May 16, 2013 (JP) .................................. 2013-104565

(51) Int. Cl.
| | |
|---|---|
| *C03B 37/02* | (2006.01) |
| *C03B 37/018* | (2006.01) |
| *C03B 37/012* | (2006.01) |
| *C03B 37/014* | (2006.01) |
| *C03B 37/027* | (2006.01) |

(52) U.S. Cl.
CPC ......... *C03B 37/0216* (2013.01); *C03B 37/0126* (2013.01); *C03B 37/0142* (2013.01); *C03B 37/0146* (2013.01); *C03B 37/01257* (2013.01); *C03B 37/01486* (2013.01); *C03B 37/01815* (2013.01); *C03B 37/01884* (2013.01); *C03B 37/02736* (2013.01); *C03B 2207/46* (2013.01)

(58) Field of Classification Search
USPC ............................................. 702/56
See application file for complete search history.

(56) References Cited

U.S. PATENT DOCUMENTS

| | | | | |
|---|---|---|---|---|
| 5,401,290 | A | * | 3/1995 | Akaike ........................ 65/485 |
| 2007/0175242 | A1 | * | 8/2007 | Hirano et al. ................ 65/379 |
| 2010/0104388 | A1 | * | 4/2010 | Suzuki et al. ............... 409/131 |
| 2010/0107765 | A1 | | 5/2010 | Murakami et al. |

FOREIGN PATENT DOCUMENTS

| | | |
|---|---|---|
| CN | 102109498 A | 6/2011 |
| JP | 2003-247943 A | 9/2003 |
| JP | 2010-139441 A | 6/2010 |

OTHER PUBLICATIONS

Office Action dated May 15, 2015, issued in counterpart Chinese application No. 201310228290.0, w/English translation. (12 pages).

(Continued)

*Primary Examiner* — Lisa Herring
(74) *Attorney, Agent, or Firm* — Westerman, Hattori, Daniels & Adrian, LLP

(57) ABSTRACT

Provided is a process for producing an optical fiber including a processing process where an optical fiber work made of a glass is held by a processing apparatus for an optical fiber work to be heated and processed, wherein in the processing process, vibration caused by an abnormality of the optical fiber work in the heated state or vibration caused by an abnormality of a glass body which is a portion of the processing apparatus for an optical fiber work and is in the state where the glass body portion is heated due to the heating of the optical fiber work is detected by using an acoustic emission sensor.

6 Claims, 10 Drawing Sheets

(56) References Cited

OTHER PUBLICATIONS

"Science and Technology Innovation Herald"; 2007; col. 1, line 2-10 on p. 14, col. 1, line 25-30 on p. 15, No. 36.

Office Action dated Apr. 22, 2015, issued in counterpart Chinese application No. 201310228290.0, w/English translation. (12 pages).
"Science and Technology Innovation Herald", col. 1, line 2-10 on p. 14, col. 1, line 25-30 on p. 15, 2007 No. 36.

* cited by examiner

FREQUENCY (kHz)

FREQUENCY (kHz)

FREQUENCY (kHz)

PROCESS FOR PRODUCING OPTICAL FIBER AND PROCESSING APPARATUS FOR OPTICAL FIBER WORK USED FOR THE SAME

The present invention relates to a process for producing an optical fiber capable of timely detecting an abnormality of an optical fiber work and a processing apparatus for an optical fiber work used for the process for producing an optical fiber.

BACKGROUND ART

An optical fiber is manufactured by drawing an optical fiber preform made of a glass. Before the drawing, in general, a glass body called "dummy glass body" is melt-spliced to the optical fiber preform. Next, a predetermined jig is attached to the dummy glass body, and a coupled body of the optical fiber preforms and the dummy glass body is suspended within a spinning furnace. In this manner, in the state where the coupled body of the optical fiber preform and the dummy glass body is suspended, at least a portion of the optical fiber preform is heated to be drawn, so that the optical fiber is manufactured. In addition, even in the process of manufacturing the optical fiber preform, there is a case where a method of splicing a glass porous body to the dummy glass body made of a glass is performed. As an example, there is a VAD (Vapor-phase Axial Deposition) method.

When the optical fiber is manufactured in this manner, the optical fiber preform and the glass body called "dummy glass body" are processing objects, which are sometimes referred to optical fiber works. For example, in the case where the above-described optical fiber preform and dummy glass body are melt-spliced to each other, each of the optical fiber preform and the dummy glass body is referred to as an optical fiber work; and in the case where the optical fiber preform is drawn, the coupled body of the optical fiber preform and the dummy glass body is referred to as an optical fiber work. In addition, in a process of manufacturing an optical fiber preform, a coupled body of a dummy glass body and a glass porous body, or the dummy glass body is referred to as an optical fiber work.

As described above, when the optical fiber preform is manufactured, when the optical fiber preform and the dummy glass body are melt-spliced to each other, when the optical fiber preform is drawn, or the like, since at least a portion of the optical fiber work is heated, the optical fiber work is subjected to thermal shock. In this manner, when the optical fiber work is subjected to the thermal shock, in some cases, crack occurs in the optical fiber work. If the crack occurs, in some cases, the manufactured optical fiber may be disconnected. Therefore, when abnormality such as crack occurs in the optical fiber work, rapid treatment is needed.

The following patent document 1 described below discloses a method of inspecting abnormality such as crack by using a laser without destruction of an inspection object. In the inspection method, occurrence of crack or a position of crack is identified by a Raman scattered light intensity distribution of the inspection object at a focus position of a laser beam.

[Patent Document 1] Japanese Patent Application Laid-Open No. 2003-247943

SUMMARY OF THE INVENTION

However, in the inspection method disclosed in the above-described Patent Document 1, the laser beam needs to hit the position of crack. Therefore, if the laser beam does not hit the position of crack, the occurrence of crack cannot be detected. In addition, in this method, after crack occurs, the occurrence of crack cannot be rapidly detected.

In addition, when the abnormality such as crack of the optical fiber work is intended to be identified through visual inspection, during melt splicing of the optical fiber preform and the dummy glass body, since the optical fiber work is spun, the crack is difficult to identify. In addition, during drawing, the optical fiber preform within a drawing furnace cannot be visually observed at an external position. In this manner, during processing of the optical fiber work, the abnormality such as crack was difficult to identify.

On the other hand, in the case where the abnormality such as crack occurs in the optical fiber work, since there is a case where rapid treatment is needed as described above, in an optical fiber manufacturing process, there is a request for timely detecting the abnormality of the optical fiber work.

The present invention is to provide a process for producing an optical fiber capable of timely detecting an abnormality of an optical fiber work during processing of the optical fiber work and a processing apparatus for an optical fiber work used for the process for producing an optical fiber.

In order to achieve the above-described object, the inventors of the present invention have been researched to find that, in the case where an abnormality such as crack or breakage occurs during heating of a glass body, vibration with a high frequency is generated from the glass body. Therefore, it is concluded that, by detecting vibration generated from an optical fiber work as a glass body during processing of the optical fiber work, an abnormality of the optical fiber work during the processing can be detected. In addition, in this research, it is also found that the same vibration is generated even in the case where a portion of a processing apparatus for the optical fiber work is made of a glass, the glass body portion of the processing apparatus is heated, and an abnormality occurs. Therefore, it is concluded that, by detecting the vibration, the occurrence of abnormality in the glass body portion of the processing apparatus can be detected during the processing, and thus, the present invention is contrived.

Namely, the present invention is a process for producing an optical fiber including a processing process where an optical fiber work made of a glass is held by a processing apparatus for an optical fiber work to be heated and processed, wherein in the processing process, vibration caused by an abnormality of the optical fiber work in the heated state or vibration caused by an abnormality of a glass body which is a portion of the processing apparatus for an optical fiber work and is in the state where the glass body portion is heated due to the heating of the optical fiber work is detected by using an acoustic emission sensor.

An acoustic emission sensor can detect vibration with a frequency higher than that of vibration occurring during a general processing of an optical fiber work by using a drill or the like. For example, the acoustic emission sensor can detect vibration with a frequency of about 50 kHz or more. Therefore, in the case where an optical fiber work or a glass body which is a portion of the processing apparatus for an optical fiber work is heated so that crack or the like occurs therein and vibration with a high frequency occurs from the optical fiber work or the glass body portion of the processing apparatus for an optical fiber work, the acoustic emission sensor can detect the vibration. In this manner, by allowing the acoustic emission sensor to detect the vibration, an abnormality of the optical fiber work or an abnormality of the glass body portion of the processing apparatus for an optical fiber work can be timely detected.

Further, it is preferable to determine that an abnormality occurs in the optical fiber work in the case where vibration with a frequency of 60 kHz or more and 90 kHz or less among the vibrations detected by the acoustic emission sensor is increased as time elapses.

The inventors of the present invention found that, in the case where an optical fiber work or glass body portion made of glass is heated so that an abnormality such as breakage or crack occurs, vibration with a frequency of 60 kHz or more and 90 kHz or less among vibrations which are propagated from the optical fiber work or the glass body portion is increased irrespective of the shape of the optical fiber work or the glass body portion. Therefore, by detecting an increase in vibration with a frequency of the above-described range, the abnormality of the optical fiber work can be appropriately detected.

In addition, it is preferable that the processing process is a process where the optical fiber work is spun and heated.

As examples of this process, there are a process for manufacturing the optical fiber preform by using an outside vaper deposition method or a CVD (Chemical Vapor Deposition) method, a process for melt splicing the optical fiber preform and the dummy glass body, a process for melt cutting a portion of the optical fiber preform, and the like. As details of the above-described processes, for example, in the outside vaper deposition method, a glass rod as a starting member is spun and heated to be attached with a glass porous body; and in the CVD method, while a glass tube is spun and heated, glass particles are attached to an inner side thereof, so that the glass particles are solidified. In the melt splicing process, the optical fiber preform and the dummy glass body are held in a lathe; and while the optical fiber preform and the dummy glass body are spun, the optical fiber preform and the dummy glass body are heated by an oxyhydrogen burner or like. In the melt cutting process, the optical fiber preform is held in a lathe; and while the optical fiber preform is spun, the optical fiber preform is heated by an oxyhydrogen burner or the like. In some cases, during the heating, crack due to thermal shock may occur in an optical fiber work such as a glass rod, a glass tube, an optical fiber preform, or a dummy glass body. Even in the case where the crack occurs therein, since the optical fiber work is spun, the occurrence of crack is difficult to identify through visual inspection, and in some cases, the crack occurs at a position where the visual inspection is not possible. However, according to the present invention, the occurrence of crack can be appropriately detected even in the middle of spinning of the optical fiber work.

In addition, it is preferable that the processing process is a process where the optical fiber work is heated in the state where the optical fiber work is held to be suspended.

As example of this process, there is a process for drawing an optical fiber or stretching the glass body in a rod shape. In this process, since the optical fiber preform which is an optical fiber work is heated, crack due to thermal shock may occur in the optical fiber preform. Even in the case where the crack occurs therein, since the optical fiber preform cannot be observed in the drawing process as described above, the occurrence of crack cannot be identified through visual inspection. However, according to the present invention, since there is no need to observe the optical fiber preform, the occurrence of crack in the optical fiber preform can be appropriately detected.

Further, in order to solve the above problem, the present invention is a processing apparatus for an optical fiber work which heats and processes an optical fiber work made of a glass used for producing an optical fiber, the processing apparatus including a holding unit which holds the optical fiber work; a heating unit which heats the optical fiber work held in the holding unit; an acoustic emission sensor which detects vibration from the optical fiber work in the heated state or vibration from a glass body which is a portion of the processing apparatus for an optical fiber work and is in the state where the glass body portion made of a glass is heated due to the heating of the optical fiber work; and a control unit which receives a signal from the acoustic emission sensor, wherein the control unit detects an abnormality during the heating and processing of the optical fiber work based on the signal from the acoustic emission sensor.

As described above, in the case where an abnormality such as crack occurs during the heating of a glass body, unique vibration with a high frequency occurs from the glass body. Therefore, in the processing apparatus for an optical fiber work according to the present invention, the vibration occurring in the optical fiber work is detected by an acoustic emission sensor, and a control unit detects the vibration indicating an abnormality of the optical fiber work. In addition, even in the case where a glass body which is a portion of the processing apparatus for an optical fiber work is heated so that crack or the like occurs therein, vibration occurring in the glass body portion is detected by the acoustic emission sensor, and the control unit detects the vibration indicating an abnormality of the optical fiber work. Therefore, according to the present invention, even in the case where an abnormality of the optical fiber work or an abnormality of the glass body portion of the processing apparatus for an optical fiber work cannot be identified through visual inspection, the abnormality of the optical fiber work or the abnormality of the processing apparatus for an optical fiber work can be timely detected.

Further, it is preferable that the control unit determines that an abnormality occurs in the optical fiber work in the case where vibration with a frequency of 60 kHz or more and kHz or less among the vibrations detected by the acoustic emission sensor is increased as time elapses.

The control unit detects an increase in vibration with a frequency of 60 kHz or more and 90 kHz or less, so that the occurrence of breakage or crack in the optical fiber work can be appropriately detected.

In addition, it is preferable that the holding unit is installed in a lathe where the optical fiber work is held so as to be spinnable.

The holding unit is installed in a lathe, so that even in the case where an optical fiber work is spun and processed by using the lathe, an abnormality of the optical fiber work can be detected. For example, in a process for manufacturing an optical fiber preform by using an outside vaper deposition method or a CVD method, in a case where an optical fiber preform and a dummy glass body are optical fiber works and melt splicing of the optical fiber preform and the dummy glass body is performed, or in a case of melt cutting an optical fiber preform to which the dummy glass body is melt-spliced, abnormality such as breakage or crack occurring in the optical fiber work due to thermal shock can be appropriately detected.

Alternatively, it is preferable that the holding unit is a suspending/holding unit which holds the optical fiber work to be suspended.

The holding unit is a suspending/holding unit, so that even in the case where the optical fiber work is processed in the suspended state by using the suspending/holding unit, an abnormality of the optical fiber work can be detected. For example, like the case where the optical fiber preform to which the dummy glass body is melt-spliced is an optical fiber work and drawing of the optical fiber preform is performed, when the optical fiber preform is processed while the optical fiber preform is suspended, an abnormality such as breakage or crack occurring in the optical fiber preform due to thermal shock can be appropriately detected.

As described hereinbefore, according to the present invention, it is possible to provide a process for producing an optical fiber capable of timely detecting an abnormality of an optical fiber work during processing of the optical fiber work and a processing apparatus for an optical fiber work used for the process for producing an optical fiber.

DESCRIPTION OF THE EMBODIMENTS

Figure 1:
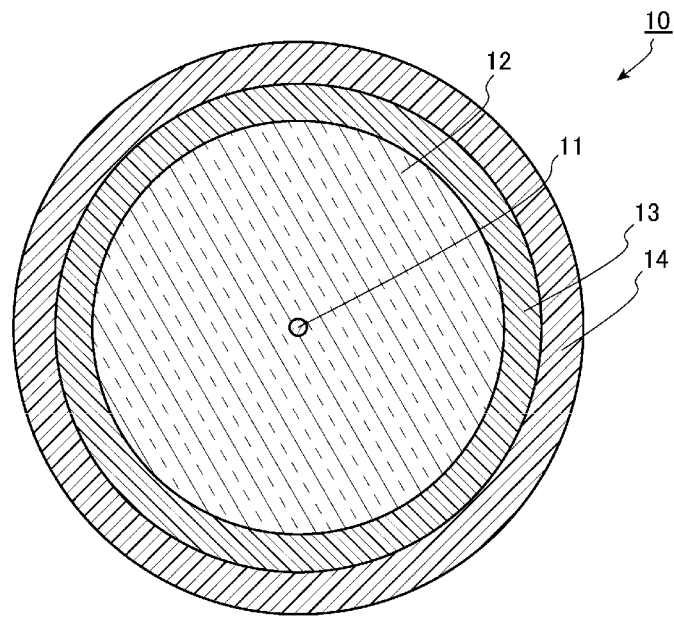
FIG. 1 is a diagram illustrating a cross section perpendicular to the longitudinal direction of an optical fiber produced by a process for producing an optical fiber according to the present invention.

Hereinafter, exemplary embodiments of a process for producing an optical fiber and a processing apparatus for an optical fiber work used for the process for producing an optical fiber according to the present invention will be described in detail with reference to the drawings. In addition, in the description hereinafter, components which are the same as or equivalent to the above-described components are denoted by the same reference numerals, and the description thereof is omitted except for particularly described cases.

FIG. 1 is a diagram illustrating a cross section perpendicular to the longitudinal direction of an optical fiber produced by process for producing an optical fiber according to the present invention.

As illustrated in FIG. 1, an optical fiber 10 produced according to the embodiment is configured to include a core 11, a clad 12 which surrounds an outer circumference surface of the core 11 without clearance, a first coat layer 13 which coats the clad 12, and a second coat layer 14 which coats the first coat layer 13. A refractive index of the clad 12 is set to be lower than the refractive index of the core 11. A diameter of the core 11 is set to be, for example, in a range of 7 μm to 10 μm, and an outer diameter of the clad 12 is set to be, for example, 125 μm. As a material of the core 11, for example, there is quartz ($SiO_2$) which impurities increasing the refractive index such as germanium (Ge) are added to. As a material of the clad 12, for example, there is pure quartz which no impurities are added to. In addition, as materials of the first coat layer 13 and the second coat layer 14, for example, there are different types of UV curable resins.

Figure 2:
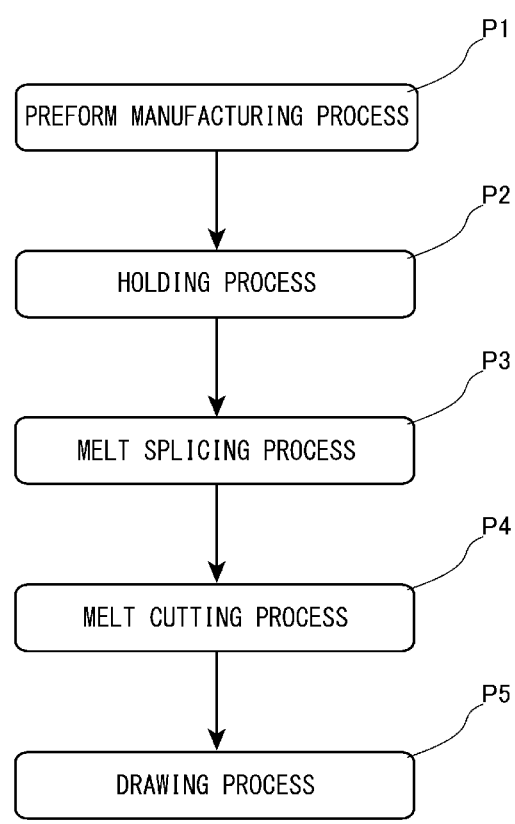
FIG. 2 is a flowchart illustrating processes of the process for producing an optical fiber of FIG. 1.

FIG. 2 is a flowchart illustrating a process for producing the optical fiber 10 illustrated in FIG. 1.

As illustrated in FIG. 2, the process for producing the optical fiber 10 according to the embodiment includes a preform manufacturing process P1 for manufacturing an optical fiber preform, a holding process P2 for holding the manufactured optical fiber preform and dummy glass body in a lathe, a melt splicing process P3 for melt splicing the optical fiber preform and dummy glass body held in the lathe, a melt cutting process P4 for melt-cutting a portion of the optical fiber preform, and a drawing process P5 for drawing the optical fiber preform which the dummy glass body is melt-spliced to. In addition, in the description hereinafter, if it is not particularly mentioned that a glass body is in a softened state or a molten state or is a porous body or the like, at least a portion of the glass body denotes a glass body in a fully solid state.

<Preform Manufacturing Process P1>

Figure 3:
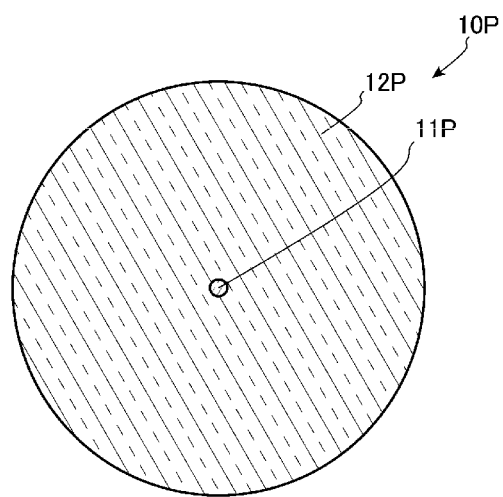
FIG. 3 is a diagram illustrating a structure of a cross section perpendicular to the longitudinal direction of an optical fiber preform.

FIG. 3 is a diagram illustrating a structure of a cross section perpendicular to the longitudinal direction of the optical fiber preform. As illustrated in FIG. 3, the optical fiber preform 10P has a cylindrical shape and is configured to include a rod-shaped core glass body 11P which is to be the core 11 and a clad glass body 12P which is to be the clad 12 surrounding the core glass body 11p without clearance. As described below, the optical fiber preform 10P is drawn and further coated, so that the optical fiber 10 illustrated in FIG. 1 is produced.

In the embodiment, a preform manufacturing process P1 is a process using a VAD method and includes a VAD process P1a and a dehydration sintering process P1b.

(VAD Process P1a)

Figure 4:
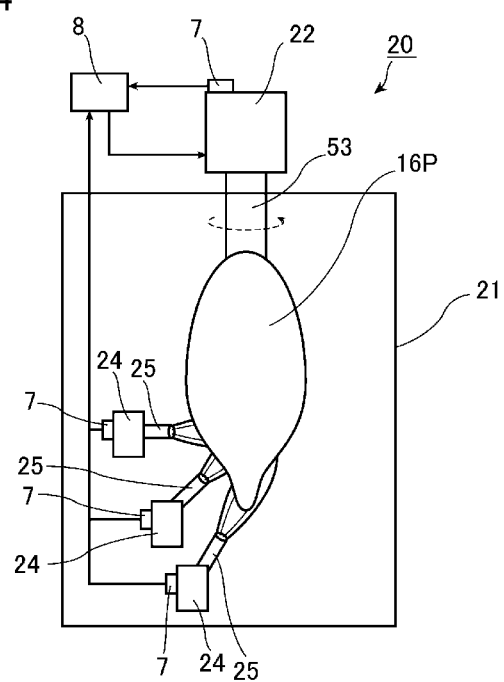
FIG. 4 is a diagram illustrating a behavior of a VAD process.

FIG. 4 is a diagram illustrating a behavior of a VAD process P1a. As illustrated in FIG. 4, a processing apparatus for an optical fiber work in this process is configured to include a VAD apparatus 20, a plurality of acoustic emission sensors 7 (hereinafter, referred to as AE sensors 7) installed in the VAD apparatus 20, and a control unit 8.

The VAD apparatus 20 is configured to include a booth 21, a suspending/holding unit 22, and a plurality of oxyhydrogen burners 24. In addition, in the VAD process, as described below, since raw material which is to be a glass body is injected together with flame by the oxyhydrogen burner 24, in some cases, the oxyhydrogen burner 24 is referred to as a deposition burner.

As described below, the booth 21 has a degree of air tightness having a function of preventing scattering of soot.

The suspending/holding unit 22 holds the glass rod 53 so that the glass rod 53 as a start member is spun in a vertical state. Although the glass rod 53 is not to be a portion of the optical fiber preform 10P as described below, since the glass rod 53 is a dummy glass body where the optical fiber preform 10P is formed in front end thereof and is an object of a heating process, even in the case where the shape of the glass rod 53 is not deformed, it may be understood that, in this process, the glass rod 53 is an optical fiber work. In addition, it may be understood that, as described below, a coupled body of the glass rod 53 and a glass porous body 16P which is spliced to the front end of the glass rod 53 is also an optical fiber work. Therefore, it is understood that the suspending/holding unit 22 which holds the glass rod 53 as the optical fiber work in the vertical state is a holding unit.

Each of the oxyhydrogen burners 24 as a heating unit is configured to include an injection tip 25 as a glass portion made of a glass so that flame for heating the optical fiber work is injected from the injection tip 25. In addition, in the embodiment, the oxyhydrogen burner 24 located at the lowermost position is a burner for forming the core glass body 11P of the optical fiber preform 10P, and the remaining two oxyhydrogen burners 24 are burners for forming the clad glass body 12P.

One of the AE sensors 7 is installed at a position to which vibration of the suspending/holding unit 22 is propagated from the glass rod 53. In the embodiment, the AE sensor 7 is installed on the upper surface of the suspending/holding unit 22 so as to detect the vibration of the suspending/holding unit 22 propagated from the glass rod 53. Other AE sensors 7 are installed at positions to which vibration of each oxyhydrogen burner 24 is propagated from the injection tip 25. The AE sensors 7 are configured to detect vibration with a frequency of 50 kHz or more and 500 kHz or less and output a signal based on the detected vibration. If a frequency of the vibration detected by the AE sensor 7 is 50 kHz or more, the vibration can be appropriately detected by a general AE sensor. Therefore, a general AE sensor can be used as the AE sensor 7. In addition, if the detected frequency is 500 kHz or less, as described below, it can be appropriately detected based on the detected vibration by the control unit 8 that an abnormality occurs.

The control unit 8 is configured to be electrically connected to the AE sensor 7 and the VAD apparatus 20, so that a signal output from the AE sensor 7 is input to the control unit 8 and it is determined whether a signal caused by an abnormality of the optical fiber work (in this process, the glass rod 53 or the coupled body of the glass rod 53 and the glass porous body 16P) or an abnormality of the injection tip 25 of the oxyhydrogen burner 24 is included to the afore-mentioned signal. In addition, the control unit 8 is configured to output a control signal to the VAD apparatus 20. In addition, the VAD apparatus 20 is configured so that operations thereof are controlled according to the control signal of the control unit 8.

In the VAD process P1*a* according to the embodiment using the above-described processing apparatus for an optical fiber work, while the glass rod 53 suspended and held by the suspending/holding unit 22 is spun about the center of shaft, soot which is to be the core glass body 11P is deposited on the front end of the glass rod 53, and consecutively to the deposition of the soot which is to be the core glass body 11P, soot which is to be the clad glass body 12P is deposited. At this time, due to the booth 21, the soot is prevented from being scattered to the exterior.

With respect to the deposition of soot on the core glass body 11P, a vaporized material made of a glass such as $SiCl_4$ and a material which is to be vaporized impurities are introduced into the flame of the oxyhydrogen burner by a carrier gas (for example, Ar, $O_2$, or the like) of which flow rate is regulated. Next, if a raw material which is to be the glass body is $SiCl_4$, $SiCl_4$ may be set to be $SiO_2$ so that soot made of $SiO_2$ and impurity particles is deposed on the front end of the glass rod 53 as a start member. At this time, the injection tip 25 of the oxyhydrogen burner 24 is also heated. In the case where germanium is added to the core 11 of the optical fiber 10 as described above, vaporized $SiCl_4$ and $GeCl_4$ are introduced into the flame of the oxyhydrogen burner 24. Next, $SiCl_4$ is set to be $SiO_2$, $GeCl_4$ is set to be $GeO_2$, and the soot made of $SiO_2$ or $GeO_2$ particles is deposited, so that the glass porous body which is to be the core glass body 11P is obtained.

Next, soot which is to be the clad glass body 12P is deposited. The soot which is to be the clad glass body 12P is deposited so that the vaporized $SiCl_4$ is introduced into the flame of the oxyhydrogen burner by the carrier gas of which flow rate is controlled and so that $SiCl_4$ is set to be $SiO_2$ and the soot made from $SiO_2$ glass and an outer circumference of the glass porous body formerly formed, which is to be the core glass body 11P, is covered. Due to the deposition of soot, the glass porous body which is to be the clad glass body 12P is formed. At this time, the injection tip 25 of the oxyhydrogen burner 24 is also heated. In the case where the clad 12 of the optical fiber 10 is constructed with quartz added with no impurities as described above, the soot of the clad glass body 12P is deposited particularly with no impurity being added. In addition, in case where the clad 12 of the optical fiber 10 is constructed with quartz added with impurities such as fluorine, a gas containing impurities together with a vaporized $SiCl_4$ is introduced into the flame of the oxyhydrogen burner. For example, in the case where the impurities are fluorine, vaporized $SiF_4$ together with the vaporized $SiCl_4$ is introduced into the flame of the oxyhydrogen burner.

In addition, a vent mechanism (not illustrated) may be arranged in the booth 21, and an unnecessary gas in this process is vented to the outside of the booth 21.

In this manner, the glass porous body 16P which is to be optical fiber preform 10P is formed on the front end of the glass rod 53.

In this process, the detection of the abnormality of the glass rod 53 or the injection tip 25 of the oxyhydrogen burner 24 is performed by detecting an increase in vibration caused by the abnormality of the glass rod 53 or the injection tip 25 as time elapses from the signal output from the AE sensor 7. In order to determine whether vibration caused by the optical fiber work called the glass rod 53 and the glass body portion called the injection tip 25 of the processing apparatus for an optical fiber work is included, it is preferable that the control unit 8 detect an increase in vibration with a specific frequency in the VAD process P1*a*. This is because, if an abnormality occurs in a heated glass body, vibration with a specific frequency is rapidly increased. As an example of the vibration with this new frequency, there is vibration with a frequency of 50 kHz or more and 500 kHz or less.

In addition, it is more preferable that the vibration with this new frequency is vibration with a frequency of 60 kHz or more and 90 kHz or less. The inventors of the present invention and the like found that, in the case where the abnormality such as crack or breakage occurs in the heated optical fiber work or the heated glass body portion, vibration with a frequency of 60 kHz or more and kHz or less occurs irrespective of the shape of the optical fiber work or the glass body portion, and the vibration is propagated to the holding unit which holds the optical fiber work or the oxyhydrogen burner. Therefore, the control unit 8 detects the occurrence of crack or breakage in the optical fiber work or the glass body portion by detecting an increase in vibration with a frequency of 60 kHz or more and 90 kHz or less. Like this process, in the case where the glass rod 53 or the coupled body of the glass rod 53 and the glass porous body 16P is spun, in some cases, although crack or breakage occurs in the glass rod 53, the occurrence cannot be identified through visual inspection. In addition, since injection tip 25 is heated to glow during the flame injection, although crack occurs in the injection tip 25, in some cases, the occurrence cannot be identified through visual inspection. However, in this manner, the control unit 8 detects an increase in vibration with a frequency of 60 kHz or more and 90 kHz or less as time elapses, so that the occurrence of crack or breakage in the injection tip 25 as an optical fiber work or a glass body portion can be appropriately detected.

The detection of an increase in vibration with a specific frequency as time elapses may be performed in the control unit 8 as follows. For example, the control unit 8 performs fast Fourier transform analysis on the signal from the AE sensor 7 only for a predetermined time period to calculate data of vibration spectrum. Next, subtraction is performed between the calculated data and the data of vibration spectrum calculated by using the same method before the above-described predetermined time period, so that data of a difference spectrum between the afore-mentioned data are calculated. If the data of vibration spectrum occurring in the case where an abnormality occurs in the glass rod 53 as an optical fiber work and the injection tip 25 as a glass body portion is included in the data of difference spectrum, the control unit 8 determines that an abnormality occurs in the glass rod 53 or the injection tip 25. At this time, in the case where vibration with a frequency of 60 kHz or more and 90 kHz or less is included in the data of difference spectrum, it may be determined that crack or breakage occurs in the glass rod 53 or the injection tip 25.

When the control unit 8 detects the abnormality of the glass rod 53 or the abnormality of the injection tip 25, the control unit 8 transmits a control signal for stopping the VAD apparatus 20 or issues an alarm indicating abnormality by using means (not illustrated).

(Dehydration Sintering Process P1b)

Next, a dehydration sintering process P1b is performed on the glass porous body 16P which is to be the optical fiber preform 10P obtained by the VAD process.

Figure 5:
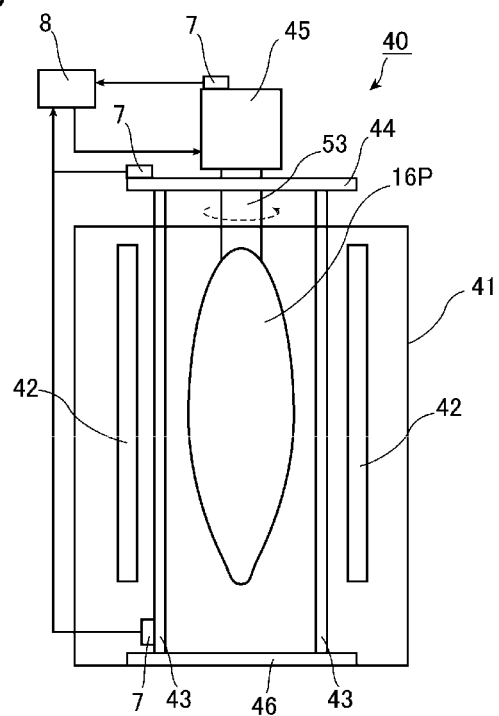
FIG. 5 is a diagram illustrating a behavior of a dehydration sintering process.

FIG. 5 is a diagram illustrating a behavior of the dehydration sintering process P1b. As illustrated in FIG. 5, a processing apparatus for an optical fiber work used in this process is configured to include a dehydration sintering apparatus 40 as an example of an apparatus for performing dehydration and sintering, a plurality of AE sensors 7 installed in the dehydration sintering apparatus 40, and a control unit 8.

The dehydration sintering apparatus 40 is configured to include a heater 42 installed within the furnace 41, a muffle 43 arranged to be surrounded by the heater 42, a muffle cover 44 formed to close the muffle 43, and a suspending/holding unit 45 which allowing the coupled body of the glass rod 53 and the glass porous body 16P obtained in the VAD process to be suspended and held in the muffle.

The muffle 43 is a glass tube made of a glass and a glass body portion of the processing apparatus for an optical fiber work of this process. The one side of the muffle 43 is closed by a plate-shaped muffle bottom 46. The muffle 43 is configured to have a size capable of allowing the entire glass porous body 16P to be inserted. In addition, an inner portion of the muffle 43 is filled with an inert gas such as Ar or He or a dehydration gas such as $Cl_2$ or $SiF_4$. In addition, the muffle cover 44 is a plate-shaped member where a hole through which the glass rod 53 is allowed to penetrate is formed, and the hole of the muffle 43 is closed.

The heater 42 as a heating unit is arranged to cover the outer circumference surface of the muffle 43. For example, the heater 42 is a heater using electrical resistance heating.

The suspending/holding unit 45 holds the glass rod 53 to allow the coupled body of the glass rod 53 and the glass porous body 16P to be spun in the vertical state in the state where the glass rod 53 is inserted into the hole of the muffle cover 44 and the glass porous body 16P is located within the muffle 43. In addition, the suspending/holding unit 22 may hold the glass rod 53 by suspending the glass rod 53 or fixedly hold the glass rod 53 by gripping the glass rod 53 in the state where the glass rod 53 is vertically positioned. Since the glass rod is an optical fiber work as described above, the suspending/holding unit 45 is understood to be a holding unit like the suspending/holding unit 22. In the embodiment, the suspending/holding unit 45 is configured to be the same as the suspending/holding unit 22.

One of AE sensors 7 is installed at a position to which vibration of the suspending/holding unit 45 is propagated from the glass rod 53. In the embodiment, the AE sensor 7 is installed on the upper surface of the suspending/holding unit 45 so as to detect the vibration of the suspending/holding unit 45 propagated from the glass rod 53. Another AE sensor 7 is installed on an outer circumference surface of the muffle 43, and the other AE sensor 7 is installed at a position to which vibration of the muffle cover 44 is propagated from the muffle 43. In addition, in order to protect the AE sensors 7, it is preferable that the AE sensors 7 installed on the muffle 43 and the muffle cover 44 be installed at positions where thermal influence is weak.

The control unit 8 is configured to be electrically connected to the AE sensor 7 and the dehydration sintering apparatus 40, so that a signal output from the AE sensor 7 is input to the control unit 8 and it is determined whether a signal caused by an abnormality of the optical fiber work (in this process, the glass rod 53 or the coupled body of the glass rod 53 and the glass porous body 16P) or an abnormality of the muffle 43 as a glass body portion is included in the afore-mentioned signal. In addition, the control unit 8 is configured to output a control signal to the dehydration sintering apparatus 40. In addition, the dehydration sintering apparatus 40 is configured so that operations thereof are controlled according to the control signal of the control unit 8.

In the dehydration sintering process P1b of the embodiment using the above-described processing apparatus for an optical fiber work, while the suspending/holding unit 45 is spun about the glass rod 53 as a center of shaft, the glass rod 53 and the glass porous body 16P are heated through the muffle 43 by the heater 42. The muffle 43 is also heated due to the heating. When the glass porous body 16P is heated, moisture existing between glass particles in the glass porous body 16P is removed, so that the glass porous body 16P becomes a fully-solid-state transparent glass body. As a result, the central portion of the glass porous body 16P becomes the core glass body 11P, and a portion thereof in the outer circumference side from the core glass body 11P becomes the clad glass body 12P.

In addition, in this process, a necessary gas is supplied from a gas supply tube (not illustrated) installed in the furnace 41, and an unnecessary gas is removed from a vent tube (not illustrated) installed in the furnace 41.

The detection of the abnormality of the glass rod 53 or the muffle 43 in this process may be performed in the same manner as the detection of the abnormality of the glass rod 53 or the injection tip 25 of the oxyhydrogen burner 24 in the VAD process. Namely, the control unit 8 may detect an increase in vibration with a specific frequency in this process. The frequency of the vibration may be set to be the same as the specific frequency detected in the VAD process.

When the control unit 8 detects the abnormality of the glass rod 53 or the muffle 43, the control unit 8 transmits a control signal for stopping the dehydration sintering apparatus 40 or issues an alarm indicating abnormality by using means (not illustrated).

A portion of the fully-solid-state transparent glass body including the core glass body 11P and clad glass body 12P obtained in this manner is subjected to cutting or polishing so as to has a cylindrical shape, so that the optical fiber preform 10P illustrated in FIG. 3 is obtained.

In addition, although a plurality of the oxyhydrogen burners 24 are used in the above-described VAD process P1*a*, for example, in the case where the glass porous body which is to be the core glass body 11P and the glass porous body which is to be the clad glass body 12P are not consecutively formed, one oxyhydrogen burner may be used. For example, in the case where the materials which are to be impurities added to the core glass body 11P cannot be vaporized similarly to some rare-earth elements, only the glass porous body which is to be the core glass body 11P is formed in the same manner as the above-described VAD process P1*a*. Next, the glass porous body is immersed in a solution where a chloride of impurities such rare-earth elements is dissolved, and after that, liquid is extracted and the glass porous body is dried. Next, similarly to the above-described dehydration sintering process P1*b*, the dehydration sintering process is performed so as to be in the state where the core glass body 11P is formed on the glass rod 53. Next, an outside vaper deposition process described below is performed so that the glass porous body which is to be the clad glass body 12*p* is formed on the outer circumference surface of the core glass body 11P. In addition, similarly to the above-described dehydration sintering process P1*b*, the dehydration sintering process is performed on the glass porous body so that the glass porous body which is to be the clad glass body 12P is set to be a fully-solid-state glass body and the clad glass body 12P is formed on the outer circumference surface of the core glass body 11P.

<Holding Process P2>

Figure 6:
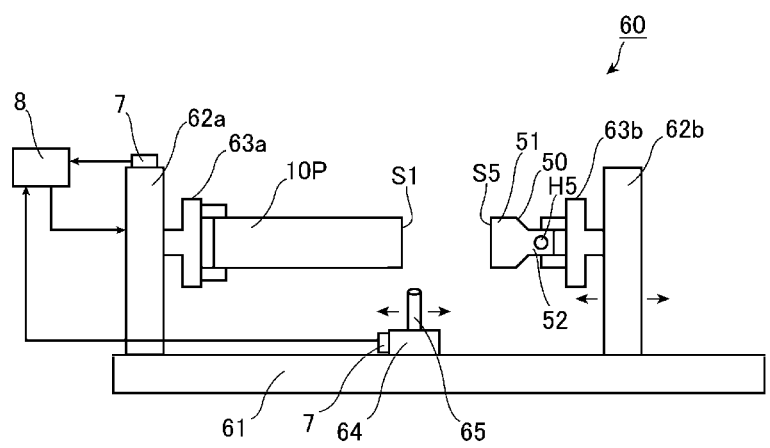
FIG. 6 is a diagram illustrating a behavior after a holding process.

Next, the manufactured optical fiber preform 10P is held in the processing apparatus for an optical fiber work of this process and following processes. FIG. 6 is a diagram illustrating a behavior after the holding process P2. As illustrated in FIG. 6, in the holding process P2, the above-described optical fiber preform 10P and the above-described dummy glass body 50 are set in the processing apparatus for an optical fiber work.

The processing apparatus for an optical fiber work of this process is configured to include a lathe 60 mainly constructed with metal, a plurality of acoustic emission (AE) sensors 7 installed in the lathe 60, and a control unit 8.

The lathe 60 is configured to include a base 61, a pair of main shaft posts 62*a* and 62*b* installed on the base 61, zippers 63*a* and 63*b* installed to the respective main shaft posts 62*a* and 62*b* to face each other, and an oxyhydrogen burner 64 which is movable between the zippers 63*a* and 63*b*.

The main shaft post 62*a* is configured to be fixed to the base 61, and the main shaft post 62*b* is configured to be installed on the base 61 so as to be movable in the direction being separated from the main shaft post 62*a* or in the direction approaching the main shaft post 62*a*.

The zippers 63*a* and 63*b* are configured to be spinnable about the main shaft posts 62*a* and 62*b* in cooperation with a motor (not illustrated) installed inside the main shaft posts 62*a* and 62*b*.

The one end side of the optical fiber preform 10P is chucked in the zipper 63*a* so that the longitudinal direction becomes horizontal, so that the optical fiber preform 10P is held in the lathe 60. In this state, the optical fiber preform 10P is configured to be spinnable about the center of shaft due to the spinning of the zipper 63*a*.

Although the shape of the dummy glass body 50 is not particularly limited, in the embodiment, the dummy glass body 50 has a shape so that the cross section thereof is set to have a circular shape and so that the one end side thereof is set to be a large-diameter portion 51 of which outer diameter is equal to the outer diameter of the optical fiber preform 10P and the other end side thereof is set to be a small-diameter portion 52 of which outer diameter is smaller than the outer diameter of the optical fiber preform 10P. In addition, a through-hole H5 is formed in the small-diameter portion 52 of the dummy glass body 50 so as to penetrate through the small-diameter portion 52 in the radial direction. In addition, the small-diameter portion 52 is chucked to the zipper 63*b*, so that the dummy glass body 50 is held in the lathe 60. In this state, the dummy glass body 50 is configured to be spinnable about the center of shaft due to the spinning of the zipper 63*b*.

In this manner, in the state where the optical fiber preform 10P and the dummy glass body 50 are chucked in the respective zippers 63*a* and 63*b*, the cross section S1 of the other end side of the optical fiber preform 10P faces the cross section S5 of the one end side of the dummy glass body 50 as illustrated in FIG. 6. In addition, it may be understood that the zippers 63*a* and 63*b* of the lathe 60 is a holding unit of the processing apparatus for an optical fiber work in order to hold the optical fiber preform 10P and the dummy glass body 50. In addition, it may be understood that, since the optical fiber preform 10P and the dummy glass body 50 are melt-spliced to each other by heating using the lathe 60 as described below, the optical fiber preform 10P and the dummy glass body 50 are optical fiber works.

In the embodiment, in the state where the optical fiber preform 10P and the dummy glass body 50 are held by the zippers 63*a* and 63*b* in the lathe 60, vibration from each of the optical fiber preform 10P and the dummy glass body 50 is propagated to the zippers 63*a* and 63*b*, is propagated to the main shaft posts 62*a* and 62*b* where the zippers 63*a* and 63*b* are installed, and is propagated to the base 61 where the main shaft posts 62*a* and 62*b* are installed.

The oxyhydrogen burner 64 as a heating unit is configured to be movable between the zippers 63*a* and 63*b* and is configured to include an injection tip 65 as a glass body portion made of a glass to allow inject flame from the injection tip 65 for heating the optical fiber preform 10P and the dummy glass body 50 as an optical fiber work.

In addition, the lathe 60 may be arranged within a booth for the convenience of measurement of a hydrogen concentration in the below-described melt splicing process P3 or the below-described melt cutting process P4.

One of AE sensors 7 is installed at a position to which vibration of the lathe 60 is propagated from the optical fiber preform 10P or the dummy glass body 50. In the embodiment, the AE sensor 7 is installed on the main shaft post 62*a* to detect the vibration of the main shaft post 62*a*. Another AE sensor 7 is installed at a position to which vibration of the oxyhydrogen burner 64 is propagated from the injection tip 65.

The control unit 8 is configured to be electrically connected to each AE sensor 7 and the lathe 6, so that a signal output from each AE sensor 7 is input to the control unit 8 and it is determined whether a signal caused by an abnormality of the optical fiber work (in this process, the optical fiber preform 10P or the dummy glass body 50) or an abnormality of the oxyhydrogen burner 64 is included in the afore-mentioned signal. In addition, the control unit 8 is configured to output a control signal to the lathe 60. In addition, the lathe 60 is configured so that operations thereof are controlled according to the control signal of the control unit 8.

<Melt Splicing Process P3>

Next, the optical fiber preform 10P and dummy glass body 50 which are held in the lathe 60 are melt-spliced to each other.

Figure 7:
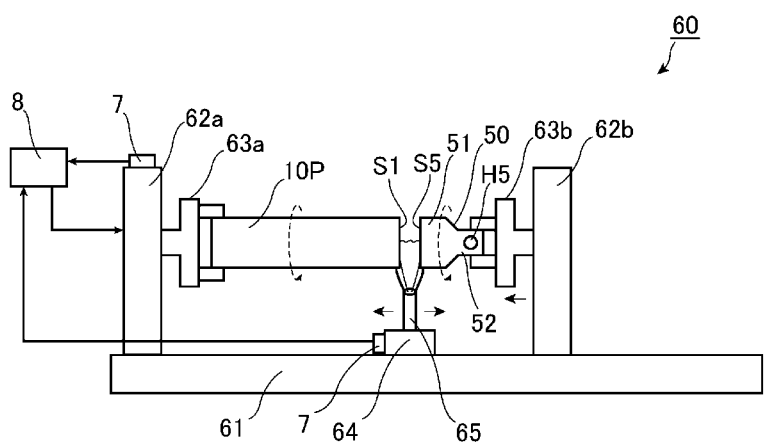
FIG. 7 is a diagram illustrating a behavior of a melt splicing process.

FIG. 7 is a diagram illustrating a behavior of this process. First, in this process, the main shaft post 62b is moved so that the cross section S1 of the optical fiber preform 10P and the cross section S5 of the dummy glass body 50 facing the optical fiber preform 10P are in a predetermined distance. In addition, as indicated by broken lines in FIG. 7, the zippers 63a and 63b are spun in the same direction, so that the optical fiber preform 10P and the dummy glass body 50 are spun in the same direction.

In this manner, in the state where the cross sections S1 and S5 are spaced in a predetermined distance and are spun in the same direction, the cross sections S1 and S5 are heated by flame of the oxyhydrogen burner 64. Therefore, when the temperature of the cross section S1 of the optical fiber preform 10P and the temperature of the cross section S5 of the dummy glass body 50 reach the respective softening points so that the cross sections S1 and S5 are softened, the main shaft post 62b is moved toward the main shaft post 62a side so that the respective cross sections S1 and S5 are in close contact with each other. Next, the main shaft post 62b is slightly moved toward the main shaft post 62a side, so that, while pressing the optical fiber preform 10P with the dummy glass body 50, the vicinities of the cross sections S1 and S5 of the optical fiber preform 10P and the dummy glass body 50 which are in close contact with each other are subjected to flaming of the oxyhydrogen burner 64. As a result, the optical fiber preform 10P and the dummy glass body 50 are melt-spliced to each other.

During the time when at least the optical fiber preform 10P and the dummy glass body 50 are subjected to the flaming of the oxyhydrogen burner 64, the AE sensor 7 on the main shaft post 62a detects the vibration of the main shaft post 62a of the lathe 60. In addition, during the time when at least the optical fiber preform 10P and the dummy glass body 50 are subjected to flaming, the AE sensor 7 installed in the oxyhydrogen burner 64 detects the vibration propagated to the AE sensor 7. Next, the signal based on the detected vibration is output from each AE sensor 7 and input to the control unit 8. As described above, the one AE sensor 7 is installed at the position to which vibration of the lathe 60 is propagated from the optical fiber preform 10P and dummy glass body 50 which are optical fiber works, and the other AE sensor 7 is installed at the position to which vibration is propagated from the injection tip 65, so that the control unit 8 detects an abnormality of the heated optical fiber preform 10P or the heated dummy glass body 50 or an abnormality of the injection tip 65 of the oxyhydrogen burner 64 heated during the heating of the optical fiber works based on the signal input from the AE sensors 7. As an example of the abnormality, there is crack or breakage occurring in the optical fiber preform 10P, the dummy glass body 50, or the injection tip 65 due to thermal shock.

The detection of the abnormality of the optical fiber preform 10P or the dummy glass body 50 is performed by detecting an increase in vibration caused by the abnormality of the optical fiber preform 10P or the dummy glass body 50 or vibration caused by the abnormality of the injection tip 65 in the signal output from the AE sensor 7 as time elapses. In order to determine whether the vibration caused by the abnormality of the optical fiber work such as the optical fiber preform 10P or the dummy glass body 50 is included in the signal, it is preferable that the control unit 8 detect an increase in vibration with a specific frequency during the melt splicing. The frequency of the vibration may be set to be the same as the specific frequency detected in the VAD process.

In addition, in the this process, it is more preferable that the vibration with a specific frequency may also be set to be the vibration with a frequency of 60 kHz or more and 90 kHz or less.

In order for the control unit 8 to detect an increase in vibration with a specific frequency as time elapses, it is preferable that the detection be performed in the same manner as the detection of an increase in frequency in the VAD process.

When the control unit 8 detects the abnormality of the optical fiber preform 10P or the dummy glass body 50, the control unit 8 transmits a control signal for stopping the lathe 60 or issues an alarm indicating abnormality by using means (not illustrated).

In this manner, the optical fiber preform 10P and the dummy glass body 50 are melt-spliced to each other in the state where it is monitored whether or not an abnormality occurs in the optical fiber preform 10P or the dummy glass body 50.

<Melt Cutting Process P4>

Next, a front end of the optical fiber preform 10P is decreased in diameter by melt-cutting a portion of the optical fiber preform 10P to which the dummy glass body 50 is melt-spliced.

Figure 8:
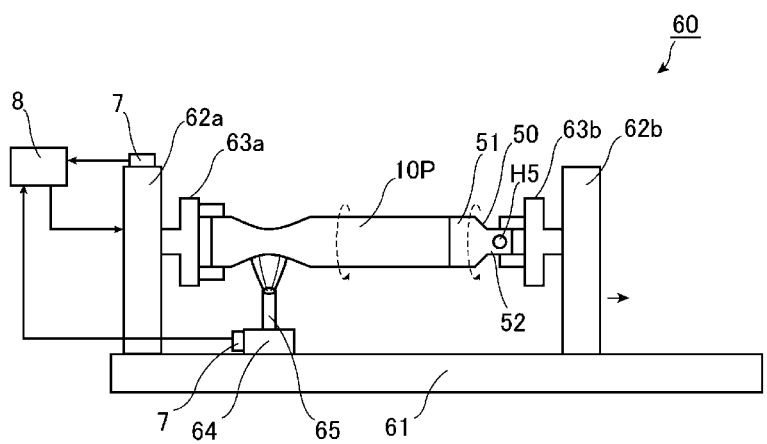
FIG. 8 is a diagram illustrating a behavior of a melt cutting process.

FIG. 8 is a diagram illustrating a behavior of the melt cutting process P4. As illustrated in FIG. 8, in this process, while the optical fiber preform 10P and the dummy glass body 50 are spun in the same direction, a portion of the optical fiber preform 10P is heated by flame of the oxyhydrogen burner 64. Next, when the temperature of the heated portion of the optical fiber preform 10P reaches the softening point to be softened, the main shaft post 62b is moved in the direction being separated from the main shaft post 62a so as to stretch the optical fiber preform 10P, so that the optical fiber preform 10P is melt-cut.

In this process, during the time when the optical fiber preform 10P is subjected to flaming of at least the oxyhydrogen burner 64, similarly to the melt splicing process P3, the AE sensor 7 detects vibration of the main shaft post 62a of the lathe 60 or vibration of the oxyhydrogen burner 64, and a signal based on the detected vibration is input to the control unit 8. Next, similarly to the melt splicing process P3, the control unit 8 detects an abnormality of the optical fiber preform 10P or the dummy glass body 50 or an abnormality of the injection tip 65 of the oxyhydrogen burner 64. In addition, similarly to the melt splicing process P3, when the control unit 8 detects the abnormality of the optical fiber preform 10P, the dummy glass body 50, or the oxyhydrogen burner 64, the control unit 8 transmits a control signal for stopping the lathe 60 or issues an alarm indicating abnormality by using means (not illustrated).

In this manner, a portion of the optical fiber preform 10P is melt-cut so that the front end thereof is decreased in diameter in the state where it is monitored whether or not an abnormality occurs in the optical fiber preform 10P or the dummy glass body 50.

<Drawing Process P5>

Figure 9:
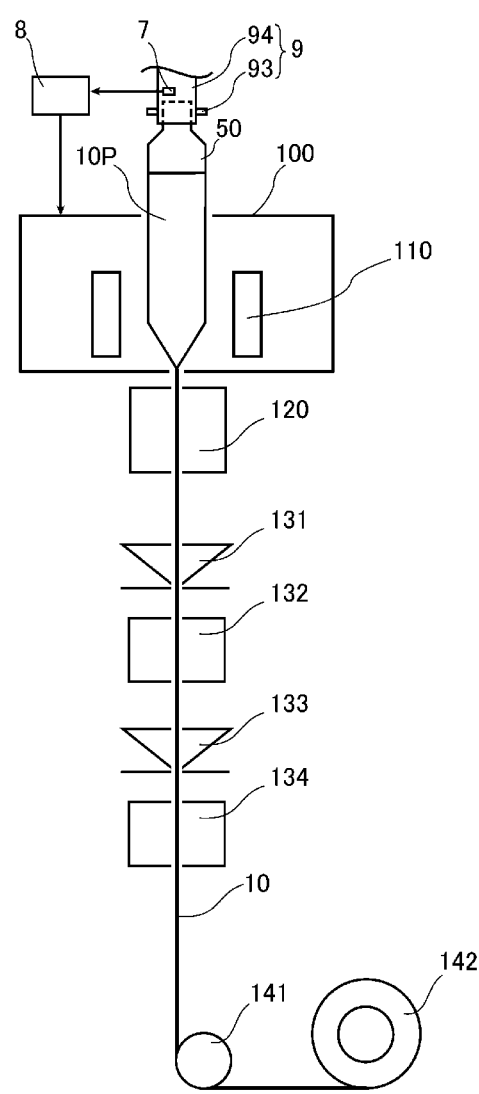
FIG. 9 is a diagram illustrating a behavior of a drawing process.

FIG. 9 is a diagram illustrating a behavior of a drawing process P5. In this process, first, the optical fiber preform 10P which the dummy glass body 50 is melt-spliced to and of which front end is decreased in diameter by melt cutting is set to a processing apparatus for an optical fiber work.

The processing apparatus for an optical fiber work of this process is configured to include a spinning furnace 100, a suspending/holding unit 9 constructed with metal, an AE sensor 7 installed in the suspending/holding unit 9, and a control unit 8. In the embodiment, as described below, the coupled body of the to-be-drawn optical fiber preform 10P and the dummy glass body 50 is an optical fiber work. In addition, the suspending/holding unit 9 is a holding unit which holds the coupled body of the optical fiber preform 10P and the dummy glass body 50.

The suspending/holding unit 9 holds the coupled body of the optical fiber preform 10P and the dummy glass body to be suspended and is configured to include a detachable pin 93 and a preform holding body 94 through which the detachable pin 93 penetrates. In addition, the spinning furnace 100 is configured to include a heating unit 110.

In this process, the AE sensor 7 is installed in the preform holding body 94 of the suspending/holding unit 9.

Figure 10:
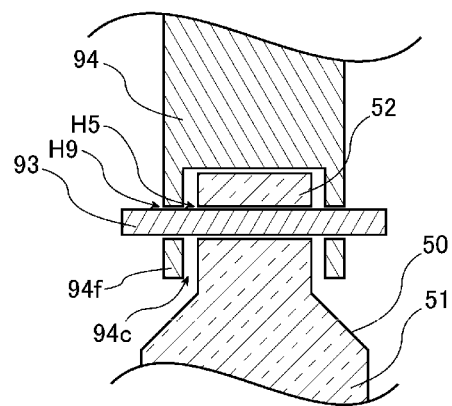
FIG. 10 is a cross-sectional view illustrating a behavior where an optical fiber work is held.

FIG. 10 is a cross-sectional view illustrating a behavior where the coupled body of the optical fiber preform 10P and the dummy glass body 50 as an optical fiber work is held by the suspending/holding unit 9. As illustrated in FIG. 10, a concave portion 94c is formed downward in the preform holding body 94, and a through-hole H9 is formed in a frame 94f of the preform holding body 94 where the concave portion 94c is formed.

First, the small-diameter portion 52 of the dummy glass body 50 is allowed to be inserted into the concave portion 94c. Next, the detachable pin 93 is allowed to penetrate through a through-hole H5 formed in the small-diameter portion 52 of the dummy glass body 50 inserted into the concave portion 94c and a through-hole H9 formed in the frame 94f of the preform holding body 94. Therefore, the preform holding body 94 is fixed to a high position, so that the coupled body of the optical fiber preform 10P and the dummy glass body 50 is suspended to the preform holding body 94 through the detachable pin 93. In this manner, the coupled body of the optical fiber preform 10P and the dummy glass body 50 is suspended to the suspending/holding unit 9, so that the optical fiber preform 10P is held so as to be suspended to the suspending/holding unit 9 through the dummy glass body 50.

In this manner, in this process, the coupled body of the optical fiber preform 10P and the dummy glass body 50 are held so as to be suspended to the suspending/holding unit 9, so that vibration of the optical fiber preform 10P and the dummy glass body 50 is propagated to the detachable pin 93 of the suspending/holding unit 9 and further propagated to the preform holding body 94. Since the AE sensor 7 is installed in the preform holding body 94 of the suspending/holding unit 9 as described above, the AE sensor is installed at a position to which vibration is propagated from the optical fiber work.

Next, as illustrated in FIG. 9, the coupled body of the optical fiber preform 10P and the dummy glass body 50 held to the suspending/holding unit 9 is moved so that at least the front end of the optical fiber preform 10P is located at the site heated by the heating unit 110 of the spinning furnace 100. In addition, if the optical fiber preform 10P is located in this manner, at least the heated position of the optical fiber preform 10P cannot be observed from an exterior side of the spinning furnace 100.

Next, the heating unit 110 of the spinning furnace 100 is allowed to emit heat so as to heat the optical fiber preform 10P. At this time, the lower end of the optical fiber preform 10P is heated to, for example, 2000° C. so as to be in the molten state. Next, glass is dissolved from the optical fiber preform 10P, so that glass is drawn.

At this time, during the time when at least the optical fiber preform 10P is heated, the AE sensor 7 detects the vibration of the preform holding body 94 of the suspending/holding unit 9. Next, the signal based on the detected vibration is output from the AE sensor 7 and input to the control unit 8. As described above, since the AE sensor 7 is installed at the position to which vibration of the suspending/holding unit 9 is propagated from the optical fiber preform 10P and the dummy glass body 50 as an optical fiber work, the control unit 8 detects an abnormality of the optical fiber preform 10P or the dummy glass body 50 based on the signal input from the AE sensor 7. As an example of the abnormality, there is an abnormality the same as the abnormality of the optical fiber preform 10P or the dummy glass body 50 in the melt splicing process P3.

Next, the detection of the abnormality of the optical fiber preform 10P or the dummy glass body 50 in this process may be performed in the same manner as the detection of the abnormality of the optical fiber preform 10P or the dummy glass body 50 in the melt splicing process P3. As described above, the optical fiber preform 10P in the spinning furnace 100 cannot be observed. Therefore, although crack or breakage occurs in a heating portion of the optical fiber preform 10P, the occurrence thereof cannot be identified through visual inspection. However, similarly to the melt splicing process P3, the control unit detects an increase in vibration caused by the abnormality of the optical fiber preform 10P or the dummy glass body 50, so that the abnormality can be appropriately detected. Moreover, the control unit 8 detects an increase in vibration with a frequency of 60 kHz or more and 90 kHz or less, so that the occurrence of crack or breakage in the optical fiber work can be appropriately detected.

When the control unit 8 detects the abnormality of the optical fiber preform 10P or the dummy glass body 50, the control unit 8 transmits a control signal for stopping the spinning furnace 100 or issues an alarm indicating abnormality by using means (not illustrated).

In this manner, when the molten glass which is drawn in the state the abnormality of the optical fiber work is monitored is extracted from the spinning furnace 100, solidification of the molten glass immediately proceeds, so that the core glass body 11P becomes the core 11, the clad glass body 12P becomes the clad 12, and the optical fiber constructed with the core 11 and the clad 12 is formed. Next, the optical fiber is allowed to pass through a cooling apparatus 120 to be cooled down to an appropriate temperature. The temperature of the optical fiber at the time of entering the cooling apparatus 120 is, for example, about 1800° C., and the temperature of the optical fiber at the time of exiting from the cooling apparatus 120 is, for example, in a range of 40° C. to 50° C.

Next, the optical fiber is allowed to pass through a coating apparatus 131 which is filled with a UV curable resin which is to be the first coat layer 13, so that the optical fiber is coated with the UV curable resin. In addition, the optical fiber is allowed to pass through a UV irradiation apparatus 132 to be irradiated with UV rays, so that the UV curable resin is cured. As a result, the first coat layer 13 is formed. Next, the optical fiber is allowed to pass through a coating apparatus 133 which is filled with a UV curable resin which is to be the second coat layer 14, so that the optical fiber is coated with the UV curable resin. In addition, the optical fiber is allowed to pass through a UV irradiation apparatus 134 to be irradiated with UV rays, so that the UV curable resin is cured. As a result, the second coat layer 14 is formed, so that the optical fiber 10 illustrated in FIG. 1 is obtained. Next, the direction of the optical fiber 10 is changed by a turn pulley 141, so that the optical fiber is wounded around a reel 142.

In this manner, the optical fiber 10 illustrated in FIG. 1 is produced in the state where it is monitored whether or not an abnormality occurs in the optical fiber preform 10P or the dummy glass body 50.

As described hereinbefore, in the embodiment, the holding unit which holds the optical fiber work in the processing apparatus for an optical fiber work is the zippers 63a and 63b of the lathe 60 in the melt splicing process P3 and the suspending/holding unit 9 in the drawing process P5. Therefore, in the processing apparatus for an optical fiber work according to the embodiment, the AE sensor 7 is installed at the position to which the vibration of the optical fiber work or the glass body as a glass body portion of the processing apparatus for an optical fiber work is propagated. In each above-described process, in some cases, at least a portion of the optical fiber work or the glass body portion of the processing apparatus for an optical fiber work is heated in a range of 1000° C. to 2000° C., so that the abnormality such as crack occurs in a fully-solid-state glass body in the state where the glass body is heated at the temperature. In this manner, by detecting the vibration corresponding to the case where the heated optical fiber work or the glass body portion of the processing apparatus for an optical fiber work causes abnormality in the fully solid state, the AE sensor 7 can timely detect the abnormality of the optical fiber work even in the state where the optical fiber work is spun or not observed.

Hereinbefore, although the present invention is explained by using the embodiment as an example, the present invention is not limited thereto. Configurations such as forms of the optical fiber or the optical fiber preform or types of gas in each process may be appropriately changed without departing from the scope of the present invention.

For example, although the above-described preform manufacturing process P1 includes the VAD process P1a and the dehydration sintering process P1b, the present invention may not be limited thereto.

(Another Example of Preform Manufacturing Process)

Figure 11:
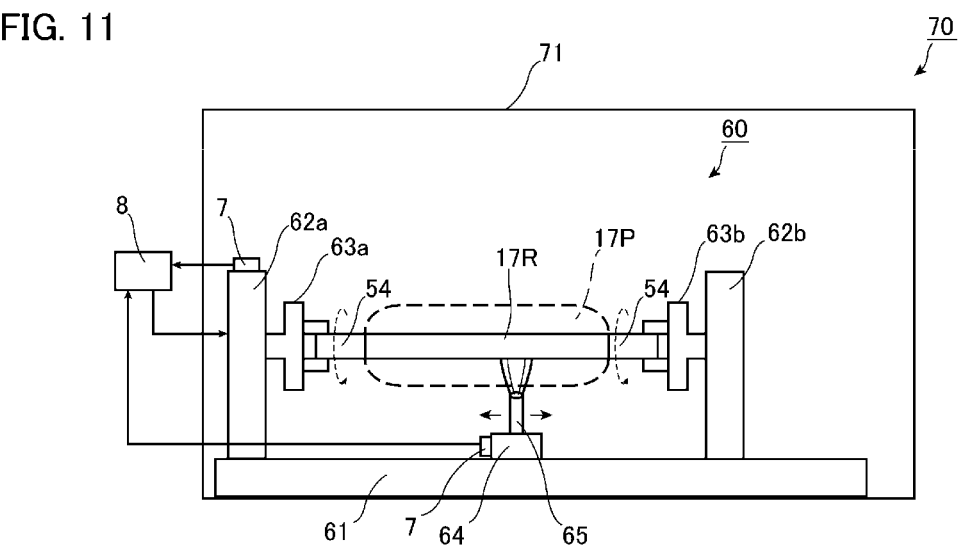
FIG. 11 is a diagram illustrating a behavior of an outside vaper deposition process.

For example, the preform manufacturing process P1 may include an outside vaper deposition process. FIG. 11 is a diagram illustrating a behavior of an outside vaper deposition process. As illustrated in FIG. 11, an processing apparatus for an optical fiber work used in this process is configured to include an external apparatus 70, a plurality of AE sensors 7 installed in the external apparatus 70, and a control unit 8.

The external apparatus 70 is configured to include a booth 71 and a lathe 60 which is the same as the above-described lathe 60 and is arranged within the booth 71. In addition, the AE sensors 7 are installed at the same positions as those of the processing apparatus for an optical fiber work in the melt splicing process P3 or the melt cutting process P4.

The outside vaper deposition process using the above-described processing apparatus for an optical fiber work is performed as follows. First, prepared is a glass body which is subjected to the above-described VAD process P1a, the above-described dehydration sintering process P1b, and other necessary processes and where an outer circumference surface of a core glass body 11P is surrounded without clearance by a clad glass body. However, the outer diameter of the clad glass body prepared in this process is set to be smaller than the diameter of the clad glass body 12P of the original optical fiber preform 10P illustrated in FIG. 3. This is because, if a portion of the inner circumference side of the clad glass body 12P is formed by forming the glass porous body which is to be the clad glass body 12P to be intentionally small in the VAD process P1a and a portion of the outer circumference side of the clad glass body 12P which is need to be attached with a large number of the glass porous bodies is formed by using an outside vaper deposition method having good efficiency, the efficiency of the entire process is improved. Therefore, the above-described prepared glass body is a rod for preform 17R of which outer diameter of the clad glass body is smaller than that of the optical fiber preform 10P. Next, the dummy glass bodies 54 made of a glass are melt-spliced to two ends of the prepared rod for preform 17R. In the melt splicing of the dummy glass body 54 to the rod for preform 17R, the dummy glass body 54 is melt-spliced to the one end of the rod for preform 17R, and after that, the dummy glass body 54 is melt-spliced to the other end of the rod for preform 17R. Each melt splicing may be performed in the same manner as the melt splicing of the optical fiber preform 10P and the dummy glass body 50 in the above-described melt splicing process P3.

Next, the dummy glass bodies 54 melt-spliced to the two ends of the rod for preform 17R are chucked to the respective zippers 63a and 63b of the lathe 60, so that the coupled body of the rod for preform 17R and the dummy glass body 54 is set in the lathe 60.

Next, in the state where the rod for preform 17R set in the lathe 60 together with the dummy glass body 54 is spun, while moving the oxyhydrogen burner 64 in the longitudinal direction of the rod for preform 17R, the rod for preform 17R is heated, so that soot which is to be the portion of the outer circumference side of the clad glass body 12P is deposited on the outer circumference surface of the rod for preform 17R. In addition, in this process, similarly to the VAD process, since a raw material which is to be a glass body together with flame may be injected from the oxyhydrogen burner 64 in some cases, the oxyhydrogen burner 64 may be referred to as a deposition burner. Similarly to the process for depositing the soot which is to be the clad glass body 12P in the VAD process P1a, in the deposition of the soot, it is preferable that a raw material such as vaporized $SiCl_4$ be introduced into the flame of the oxyhydrogen burner by a carrier gas ($A_r$, $O_2$, or the like) of which flow rate is controlled. Therefore, the glass porous body 17P which is to be a portion of the outer circumference side of the clad glass body 12P is formed on the outer circumference surface of the rod for preform 17R. In addition, in FIG. 11, the glass porous body 17P is indicated by a broken line, and the flame injected from the oxyhydrogen burner 64 is illustrated in the state where the glass porous body 17P is not formed.

In this process, similarly to the above-described melt splicing process P3 or the above-described melt cutting process P4, the vibration of the main shaft post 62a of the lathe 60 or the vibration of the oxyhydrogen burner 64 is detected by the AE sensor 7, and a signal based on the detected vibration is input to the control unit 8. Next, similarly to the melt splicing process P3 or the melt cutting process P4, the control unit 8 detects the abnormality of the rod for preform 17R or the dummy glass body 54 or the abnormality of the injection tip 65 of the oxyhydrogen burner 64. Next, similarly to the melt splicing process P3 or the melt cutting process P4, when the control unit 8 detects the abnormality of the rod for preform 17R, the dummy glass body 54, or the oxyhydrogen burner 64, the control unit 8 transmits a control signal for stopping the lathe 60 or issues an alarm indicating abnormality by using means (not illustrated).

Next, the dehydration sintering process is performed on the glass body where the glass porous body 17P is formed on the outer circumference surface of the rod for preform 17R in the same manner as the above-described dehydration sintering process P1b. Next, a portion of the fully-solid-state transparent glass body including the core glass body 11P and clad glass body 12P obtained in this manner is subjected to cutting or polishing so as to has a cylindrical shape, so that the optical fiber preform 10P illustrated in FIG. 3 is obtained.

In addition, although the rod for preform 17R is set to be in the horizontal state in the lathe 60 in this process, a lathe where the rod for preform 17R is set to be in the vertical state may be used.

(Still Another Example of Preform Manufacturing Process P1)

Figure 12:
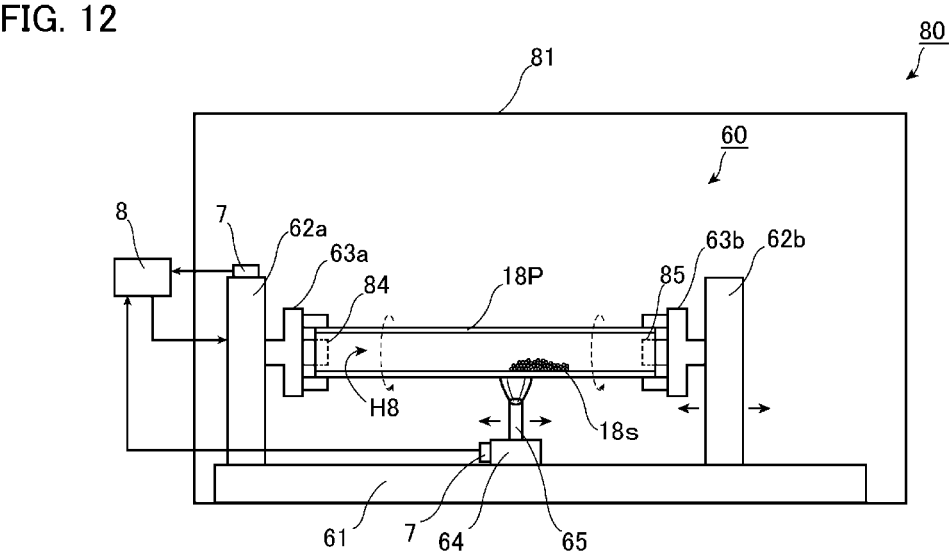
FIG. 12 is a diagram illustrating a behavior of a CVD process.

In addition, although the preform manufacturing process P1 in the above-described embodiment uses the VAD method, a CVD method may be used. FIG. 12 is a diagram illustrating a behavior of a CVD process. As illustrated in FIG. 12, a processing apparatus for an optical fiber work used in this process is configured to include a CVD apparatus 80, a plurality of AE sensors 7 installed in the CVD apparatus 80, and a control unit 8.

The CVD apparatus 80 is configured to include a booth 81 and a lathe 60 which is arranged in the booth 81 and has the same configuration as the above-described lathe 60 except that a gas supply tube 84 and a vent tube 85 are installed. The gas supply tube 84 is configured to be installed near the center of the one zipper 63a so as to supply a carrier gas and a raw gas such as $SiCl_4$ supplied from a gas supply unit (not illustrated). In addition, the vent tube 85 is configured to be installed near the center of the other zipper 63b to be connected to a gas vent unit (not illustrated) so as to vent unnecessary gas.

The external apparatus 70 is configured to include a booth 71 and a lathe 60 which is arranged in the booth 71 and has the same configuration as the above-described lathe 60. In addition, each AE sensor 7 is installed at the same position as the position in the processing apparatus for an optical fiber work in the melt splicing process P3 or the melt cutting process P4.

The CVD process using the processing apparatus for an optical fiber work is performed as follows. First, the two ends of the glass tube 18P as an optical fiber work which is to be a portion of the clad glass body 12P of the optical fiber preform 10P are chucked to the respective zippers 63a and 63b, so that the glass tube 18P is set in the lathe 60. At this time, as illustrated in FIG. 12, the front end of the glass tube 18P is inserted into a through-hole H8.

Therefore, in the state where the glass tube 18P is set, a glass layer is laminated on an inner wall of the glass tube 18P. In the embodiment, first, a clad glass layer which is to be the clad glass body 12P is laminated on the inner wall of the glass tube 18P, and next, a core glass layer which is to be the core glass body 11P is laminated. In this process, the glass tube 18P is spun about the shaft by spinning the zippers 63a and 63b, and the oxyhydrogen burner 64 is moved in the longitudinal direction of the glass tube 18P, so that the glass tube 18P is heated. At this time, necessary raw gases such as $SiCl_4$ or $GeCl_4$ are supplied from the gas supply tube 84 into the through-hole H8, and unnecessary gases are vented from the vent tube 85. Next, soot 18s originated from the raw gas is deposited, and the deposited soot 18s is heated through the movement of the burner 58, so that the soot 18s becomes the glass layer. This operation is repeated, so that the laminated glass layer becomes a portion of the glass tube 18P or the thickness of the glass tube 18P becomes large. In addition, after the soot 18s is roughly deposited, the glassification of the soot 18s may be performed at the final stage. In addition, in the lamination of the glass layer which is to be the clad glass body 12P, the $SiCl_4$ gas is supplied from the gas supply tube 84 into the glass tube 18P; and in the lamination of the glass layer which is to be the core glass body 11P, the $SiCl_4$ gas and the $GeCl_4$ gas are supplied from the gas supply tube 84 into the glass tube 18P. In this manner, the glass tube 18P where the glass layer which is to be the clad glass body 12P is laminated on the outer circumference side and the glass layer which is to be the core glass body 11P is laminated on the inner circumference side is obtained.

Next, a collapsing process for collapsing the though-hole of the glass tube 18P obtained in the CVD process is performed. In the collapsing process, the supply of the raw gas is stopped, and by reciprocally moving the oxyhydrogen burner 64, the glass tube is heated. Due to the heating, the through-hole H8 of the glass tube 18P is shrunk, so that the through-hole H8 is finally collapsed. This process is performed under a reduced pressure. At this time, it is preferable that the glass tube 18P be spun about the center of shaft.

In addition, similarly to the above-described melt splicing process P3 or the above-described melt cutting process P4, in the above-described CVD process and the above-described collapse process, the vibration of the main shaft post 62a of the lathe 60 or the vibration of the oxyhydrogen burner 64 is detected by the AE sensor 7, and a signal based on the detected vibration is input to the control unit 8. Next, similarly to the melt splicing process P3 or the melt cutting process P4, the control unit detects an abnormality of the glass tube 18P or the injection tip 65 of the oxyhydrogen burner 64. Next, similarly to the melt splicing process P3 or the melt cutting process P4, when the control unit 8 detects the abnormality of the glass tube 18P or the oxyhydrogen burner 64, the control unit 8 transmits a control signal for stopping the lathe 60 or issues an alarm indicating abnormality by using means (not illustrated).

In addition, as means for heating the glass tube 18P in this process, a heater furnace or the like may be used instead of the oxyhydrogen burner 64. In this case, the AE sensor 7 installed in the oxyhydrogen burner 64 is unnecessary.

Other Modified Examples

In addition, since the optical fiber illustrated in FIG. 1 is an exemplary one, other forms of optical fibers may be available. For example, the cross section of the outer circumference surface of the clad may have a shape of polygon, or an external clad may be formed to surround the outer circumference surface of the clad without clearance.

In addition, although there is the case where a plurality of the AE sensors 7 are installed in the above-described processes, the AE sensors 7 may be installed at one position. For example, the AE sensors 7 installed in the VAD apparatus 20 may be installed only on the suspending/holding unit 22 or only in the oxyhydrogen burner 24. In addition, the AE sensors 7 installed in the lathe 60 may be installed only on the main shaft post 62 or only in the oxyhydrogen burner 64. For example, in the above-described embodiment, the injection tips 25 and 65 of the oxyhydrogen burners 24 and 64 are made of not a glass body but metal or ceramic. In this case, the AE sensors 7 installed in the oxyhydrogen burners 24 and 64 are unnecessary. In addition, one of the AE sensors 7 installed in the dehydration sintering apparatus may be omitted, and thus, for example, only one AE sensor 7 may be installed in the muffle 43.

In addition, in some processes, an optical fiber work may not be spun within the process limit.

In addition, in the above-described embodiment, although vibration is detected by using one AE sensor 7, vibration may be detected by using a plurality of AE sensors 7. In this case, an abnormality of an optical fiber work can be more accurately detected. For example, in the melt splicing process P3 or the melt cutting process P4, AE sensors 7 may be installed to the respective main shaft posts 62a and 62b of the lathe 60.

EXAMPLES

Hereinafter, the present invention will be described more in detail by using Examples and Comparative Example. However, the present invention is not limited thereto.

Example 1

Figure 19:
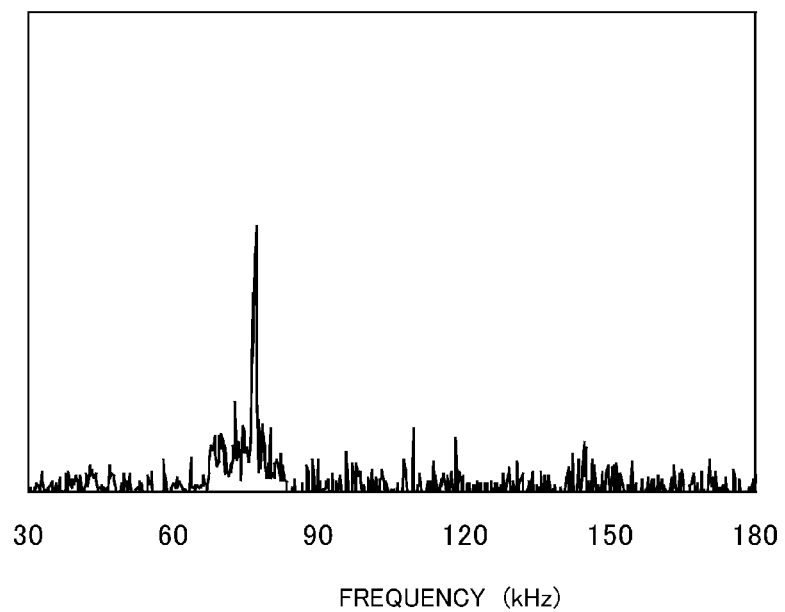
FIG. 19 is a diagram illustrating a difference spectrum between vibration in the case where no breakage occurs and vibration in the case where breakage occurs in Example 4.

A glass rod which had a cylindrical shape having a diameter of 100 mm and a length of 1500 mm was prepared in comparison to an optical fiber work. Next, the same apparatus as the processing apparatus for an optical fiber work illustrated in FIG. 6 was prepared, and the prepared glass rod was chucked to the zippers of the lathe in the same manner as the optical fiber preform 10P illustrated in FIG. 6. Next, while spinning the glass rod at 30 rpm, vibration of the main shaft post was detected by the AE sensor installed in the main shaft post of the lathe. The vibration was analyzed through fast Fourier transform. The result is illustrated in FIG. 19.

Figure 13:
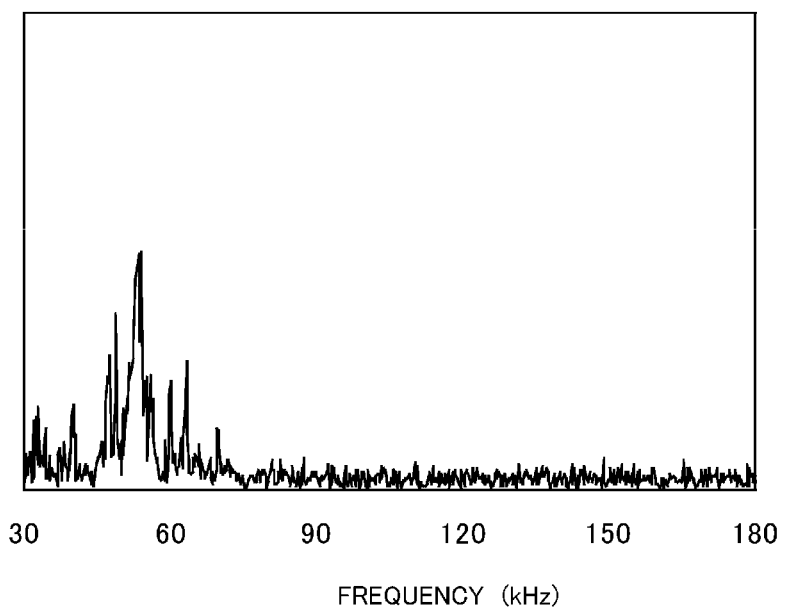
FIG. 13 is a diagram illustrating a spectrum of vibration in the case where no breakage occurs in Example 1.

In addition, the glass rod was subjected to flaming of the oxyhydrogen burner in the state where the spinning of the glass rod is maintained. At this time, by increasing the power of the oxyhydrogen burner, strong thermal influence was exerted to the glass rod. In ten minutes after the glass rod was started to be flamed, breakage occurred in the chucked portion of the glass rod. At this time, as the time point of the occurrence of breakage is included, the vibration of the main shaft post was detected by the AE sensor installed in the main shaft post of the lathe, and the vibration was analyzed through fast Fourier transform. Therefore, a difference spectrum was obtained between the above-described analysis result and the analysis result illustrated in FIG. 13 of the case where no breakage occurred. The result is illustrated in FIG. 14.

Figure 14:
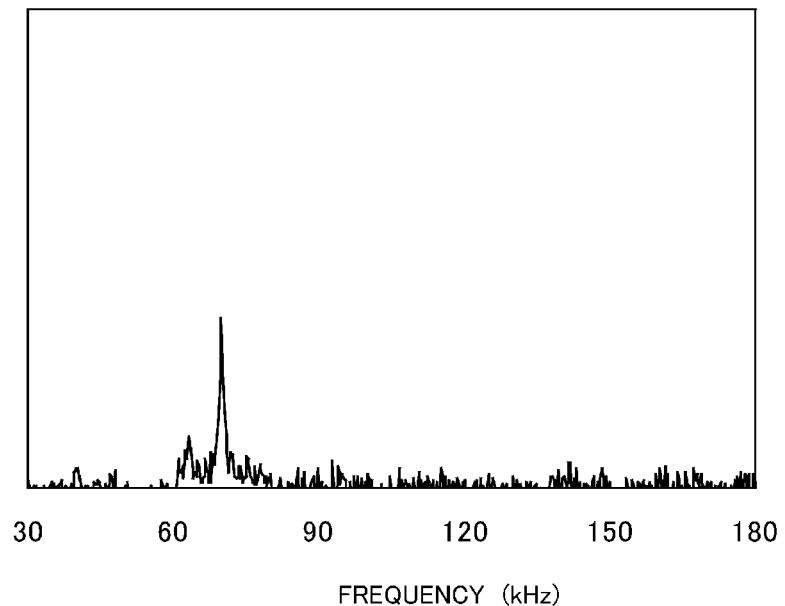
FIG. 14 is a diagram illustrating a difference spectrum between vibration in the case where no breakage occurs and vibration in the case where breakage occurs in Example 1.

As illustrated in FIG. 14, it was found that an increase in vibration with a frequency of 60 kHz or more and 90 kHz or less occurred, and the vibration was caused by the breakage of the glass rod. Therefore, it was verified that an abnormality of the glass rod was able to be timely detected by allowing the AE sensor to detect the vibration caused by the abnormality of the glass rod.

Example 2

A glass rod which was the same as the glass rod of Example 1 and an optical fiber preform which had the same configuration as that of the optical fiber preform illustrated in FIG. 3 and had the same size as that of the glass rod were prepared. Next, an outer circumference surface near the other end of the glass rod was scratched. Next, the side opposite to the scratched side of the glass rod was chucked to the one zipper of the lathe of the processing apparatus for an optical fiber work used in Example 1, and the optical fiber preform was chucked to the other zipper.

Next, the glass rod and the optical fiber preform were spun in the same manner as Example 1, and vibration was detected by the AE sensor. Next, the detected vibration continued to be analyzed through fast Fourier transform by the control unit.

Next, the oxyhydrogen burner was ignited, and the facing surfaces of the glass rod and optical fiber preform were heated. When the facing surfaces approached the softening point, the glass rod and the optical fiber preform were allowed to be in close contact with each other and to be further heated, so that the glass rod and the optical fiber preform were melt-spliced to each other. In the stage of continuously heating after the glass rod and the optical fiber preform were allowed to be in close contact with each other, breakage occurred in the glass rod from the scratch of the glass rod as a starting point.

Next, a difference spectrum was obtained between the analysis result of the case where no breakage occurred and the analysis result including the time point of the occurrence of breakage. The result is illustrated in FIG. 15.

Figure 15:
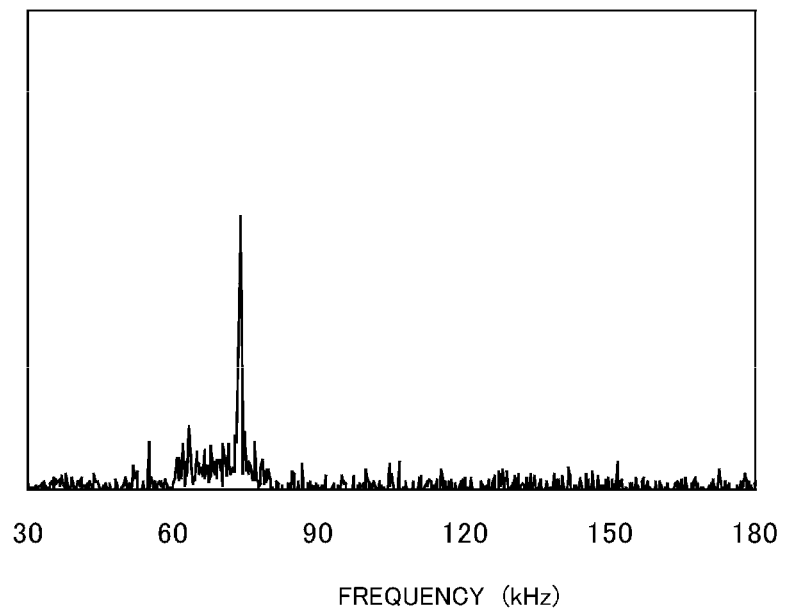
FIG. 15 is a diagram illustrating a difference spectrum between vibration in the case where no breakage occurs and vibration in the case where breakage occurs in Example 2.

As illustrated in FIG. 15, similarly to Example 1, it was found that an increase in vibration with a frequency of kHz or more and 90 kHz or less occurred, and the vibration was caused by the breakage of the glass rod. Therefore, it was found that, even in the state where two optical fiber works were in contact with each other, the vibration with the same frequency occurred. In addition, it was verified that, even in the case where an abnormality occurred in one optical fiber work in the state where two optical fiber works were in contact with each other, the abnormality thereof was able to be timely detected by allowing the AE sensor to detect the vibration.

Example 3

Figure 16:
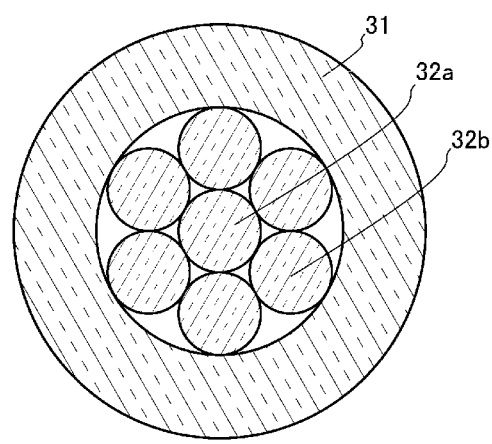
FIG. 16 is a diagram illustrating a behavior of a cross section perpendicular to the longitudinal direction of an optical fiber preform in Example 3.

A glass tube having a diameter of 100 mm, a length of 1500 mm, and a thickness of 20 mm and seven glass rods having the same length as the glass tube and a diameter of 20 mm were prepared. An outer circumference surface near one end of one of the glass rods was scratched. Next, all the glass rods are inserted into a through-hole of the glass tube, so that an optical fiber preform was obtained. The scratched glass rod is located at the center of the optical fiber preform. The behavior of the optical fiber preform in the cross section perpendicular to the longitudinal direction was illustrated in FIG. 16. In FIG. 16, reference numeral 31 denotes the glass tube; reference numeral 32a denotes the scratched glass rod; and reference numeral 32b denotes other glass rods which were not scratched. In addition, the same glass rod as the glass rod of Example 1 was prepared.

Next, the glass rod was chucked to the one zipper of the lathe of the processing apparatus for an optical fiber work used in Example 1, and the optical fiber preform was chucked to the other zipper. The optical fiber preform was chucked so that the scratch of the scratched glass rod 32a is located at the side of the glass rod chucked to the other zipper.

Next, the glass rod and the optical fiber preform were spun in the same manner as Example 1, and vibration was detected by the AE sensor. Next, the detected vibration continued to be analyzed through fast Fourier transform by the control unit.

Next, the oxyhydrogen burner was ignited, and the facing surfaces of the glass rod and optical fiber preform were heated. When the facing surfaces approached the softening point, the glass rod and the optical fiber preform were allowed to be in close contact with each other and to be further heated, so that the glass rod and the optical fiber preform were melt-spliced to each other. Next, while the spinning is maintained, the oxyhydrogen burner was extinguished, and the glass rod and the optical fiber preform were naturally cooled. In the middle of the natural cooling, breakage occurred in the optical fiber preform from the scratch of the glass rod as a starting point.

Next, a difference spectrum was obtained between the analysis result of the case where no breakage occurred and the analysis result including the time point of the occurrence of breakage. The result is illustrated in FIG. 17.

Figure 17:
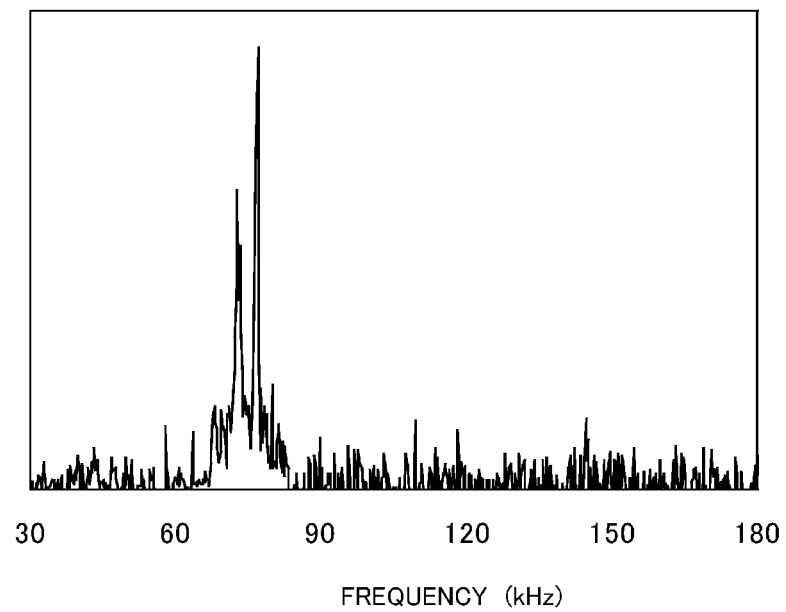
FIG. 17 is a diagram illustrating a difference spectrum between vibration in the case where no breakage occurs and vibration in the case where breakage occurs in Example 3.

As illustrated in FIG. 17, similarly to Example 1, it was found that an increase in vibration with a frequency of kHz or more and 90 kHz or less occurred, and the vibration was caused by the breakage of the glass rod. Therefore it was found that, even in the case where breakage occurred inside an optical fiber preform formed by combining plural members, the vibration with the same frequency occurred. In addition, it was verified that, even in the case where an abnormality occurred in the optical fiber preform as an optical fiber work, the abnormality thereof was able to be timely detected by allowing the AE sensor to detect the vibration.

Example 4

Figure 18:
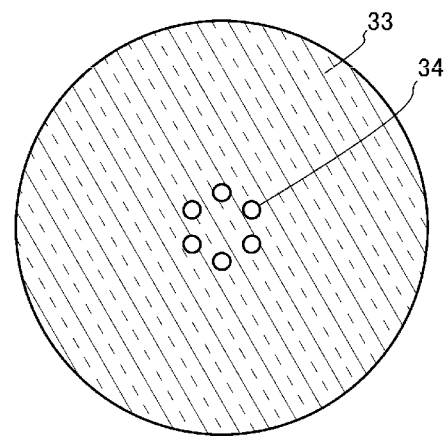
FIG. 18 is a diagram illustrating a behavior of a cross section perpendicular to the longitudinal direction of an optical fiber preform in Example 4.

Two glass rods which were the same as the glass rod of Example 1 were prepared. Next, by performing a punching process on one glass rod, six through-holes having a diameter of 5 mm and penetrating through the glass rod in the longitudinal direction to surround the central shaft were formed in the glass rod. An inner circumference surface of the glass rod where the through-hole is formed is not subjected to a polishing process, and in the punching process, the inner circumference surface was scratched. The behavior of the glass rod where the through-hole was formed in the cross section perpendicular to the longitudinal direction was illustrated in FIG. 18. In FIG. 18, reference numeral 33 denotes the glass rod; and reference numeral 34 denotes the though-hole formed in the glass rod 33.

Next, the glass rod where the through-hole was not formed was chucked to the one zipper of the lathe of the processing apparatus for an optical fiber work used in Example 1, and the glass rod where the through-hole was formed was chucked to the other zipper.

Next, the glass rods were spun in the same manner as Example 1, and vibration was detected by the AE sensor. Next, the detected vibration continued to be analyzed through fast Fourier transform by the control unit.

Next, the oxyhydrogen burner was ignited, and the facing surfaces of the glass rods were heated. When the facing surfaces approached the softening point, the glass rods were allowed to be in close contact with each other and to be further heated, so that the glass rods were melt-spliced to each other. Next, while the spinning is maintained, the oxyhydrogen burner was extinguished, and each glass rod was naturally cooled. Next, the oxyhydrogen burner was ignited again, and each melt-sliced glass rod was flame-polished by traversing the oxyhydrogen burner. In addition, an oxyhydrogen burner was fixed at a position separated by 100 cm from the melt-spliced position of the glass rod where the through-hole was formed, and the melt cutting was performed on the glass rod where the through-hole was formed. At this time, breakage occurred in the optical fiber preform from the scratch of the inner circumference surface of the glass rod as a starting point.

Next, a difference spectrum was obtained between the analysis result of the case where no breakage occurred and the analysis result including the time point of the occurrence of breakage. The result is illustrated in FIG. 19.

As illustrated in FIG. 19, similarly to Example 1, it was found that an increase in vibration with a frequency of kHz or more and 90 kHz or less occurred, and the vibration was caused by the breakage of the glass rod. Therefore it was found that, even in the case where breakage occurred during the melt cutting of an optical fiber preform, the vibration with the same frequency occurred. In addition, it was found that the vibration with the same frequency occurred irrespective of the shape of the glass rod. In addition, it was verified that, even in the case where an abnormality occurred in the optical fiber preform as an optical fiber work, the abnormality thereof was able to be timely detected by allowing the AE sensor to detect the vibration.

It was verified from the results of Examples hereinbefore that the abnormality of the optical fiber work was able to be detected by allowing the AE sensor to detect the vibration of the holding unit for the optical fiber work during the processing of the optical fiber work. In addition, it was found that the breakage of the optical fiber work was able to be detected by detecting the vibration with a frequency of 60 kHz or more and 90 kHz or less among the vibrations which were propagated from the holding unit to the AE sensor. Since the frequency of the vibration was a frequency at which the vibration is propagated through a processing unit for the optical fiber work as a work made of glass, it was understood that the vibration was able to be detected even in the drawing process for drawing the optical fiber preform.

As described hereinbefore, according to the present invention, it is possible to provide a process for producing an optical fiber capable of timely detecting an abnormality of an optical fiber work and a processing apparatus for an optical fiber work used for the process for producing an optical fiber, which are useful to produce various types of optical fibers.

What is claimed is:

1. A process for producing an optical fiber comprising
a processing process where an optical fiber work made of a glass is held by a processing apparatus for an optical fiber work to be heated and processed,
wherein in the processing process, vibration caused by crack or breakage of the optical fiber work in the heated state or vibration caused by crack or breakage of a glass body which is a portion of the processing apparatus for an optical fiber work and is in the state where the glass body portion is heated due to the heating of the optical fiber work is detected by using an acoustic emission sensor.

2. The process for producing an optical fiber according to claim 1, wherein it is determined that the crack or breakage occurs in the optical fiber work in the case where vibration with a frequency of 60 kHz or more and 90 kHz or less among the vibrations detected by the acoustic emission sensor is increased as time elapses and that the the crack or breakage occurs in the heated glass body in the case where vibration with a frequency of 60 kHz or more and 90 kHz or less among the vibrations detected by the acoustic emission sensor is increased as time elapses.

3. The process for producing an optical fiber according to claim 1, wherein the processing process is a process where the optical fiber work is spun and heated.

4. The process for producing an optical fiber according to claim 1, wherein the processing process is a process where the optical fiber work is heated in the state where the optical fiber work is held to be suspended.

5. The process for producing an optical fiber according to claim 2, wherein the processing process is a process where the optical fiber work is spun and heated.

6. The process for producing an optical fiber according to claim 2, wherein the processing process is a process where the optical fiber work is heated in the state where the optical fiber work is held to be suspended.

* * * * *